(12) United States Patent
Kishi et al.

(10) Patent No.: US 8,768,285 B2
(45) Date of Patent: Jul. 1, 2014

(54) SYNCHRONIZATION OF FRONT-END AND BASEBAND UNITS IN WIRELESS COMMUNICATIONS DEVICE BY WIRELESSLY TRANSMITTING CLOCK SIGNAL THEREBETWEEN

(75) Inventors: Takahiko Kishi, Minato-ku (JP); Hiroki Okada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 273 days.

(21) Appl. No.: 12/729,585

(22) Filed: Mar. 23, 2010

(65) Prior Publication Data

US 2010/0248644 A1 Sep. 30, 2010

(30) Foreign Application Priority Data

Mar. 24, 2009 (JP) ................................ 2009-072099

(51) Int. Cl.
*H04B 7/02* (2006.01)
*H04B 7/04* (2006.01)
*H04B 7/08* (2006.01)
*H04B 1/40* (2006.01)
*H04B 1/16* (2006.01)
*H04W 56/00* (2009.01)
*H04B 7/00* (2006.01)

(52) U.S. Cl.
USPC .............. 455/334; 455/68; 455/101; 370/350

(58) Field of Classification Search
USPC ............................ 455/68, 90.2, 297, 101, 334
See application file for complete search history.

(56) References Cited

U.S. PATENT DOCUMENTS

| 5,410,588 | A | 4/1995 | Ito | |
| 5,917,627 | A * | 6/1999 | King | 398/98 |
| 6,731,624 | B1 | 5/2004 | Maekawa et al. | |
| 7,720,077 | B1 * | 5/2010 | Healy et al. | 370/395.62 |
| 2004/0224652 | A1 | 11/2004 | Hara | |
| 2005/0080561 | A1 * | 4/2005 | Abraham et al. | 701/213 |
| 2006/0067262 | A1 | 3/2006 | Troemel, Jr. | |

(Continued)

FOREIGN PATENT DOCUMENTS

| JP | A-4-306924 | 10/1992 |
| JP | A-11-331121 | 11/1999 |

(Continued)

OTHER PUBLICATIONS

Japanese Office Action issued in Japanese Patent Application No. 2009-072099 on Feb. 8, 2011 (with translation).

*Primary Examiner* — Temesgh Ghebretinsae
*Assistant Examiner* — Devan Sandiford
(74) *Attorney, Agent, or Firm* — Oliff PLC

(57) ABSTRACT

A wireless device includes a baseband unit and front-end units that are provided in individual housings. The baseband unit and the front-end units are connected to each other by wire. A transmitter for synchronization that converts a signal based on a reference clock into a radio signal and transmits the radio signal as a clock synchronization signal is provided in any one of the housings, and receivers for synchronization that receive the signal for the clock synchronization and PLLs that generate a clock synchronized with a reference clock signal which is obtained from the received clock synchronization signal are provided in the housings other than the housing having the transmitter provided therein. In order to simultaneously process a plurality of wireless devices having different symbol rates, it is preferable to provide the transmitter, the receiver, and the PLL for each reference clock.

8 Claims, 3 Drawing Sheets

(56) References Cited

U.S. PATENT DOCUMENTS

| | | | |
|---|---|---|---|
| 2006/0244658 A1* | 11/2006 | Abraham | 342/357.15 |
| 2007/0071078 A1* | 3/2007 | Yoshida et al. | 375/219 |
| 2007/0133493 A1* | 6/2007 | Maruhashi et al. | 370/342 |
| 2008/0144497 A1* | 6/2008 | Ramprashad et al. | 370/230.1 |
| 2008/0159444 A1* | 7/2008 | Terada | 375/340 |
| 2008/0160924 A1* | 7/2008 | Rofougaran | 455/73 |
| 2008/0195920 A1* | 8/2008 | Luce et al. | 714/798 |
| 2009/0076660 A1* | 3/2009 | Goldberg et al. | 700/284 |
| 2009/0164821 A1* | 6/2009 | Drescher | 713/323 |
| 2009/0258628 A1* | 10/2009 | Lindoff et al. | 455/302 |
| 2010/0034192 A1* | 2/2010 | Beamish et al. | 370/350 |

FOREIGN PATENT DOCUMENTS

| | | |
|---|---|---|
| JP | A-2000-252951 | 9/2000 |
| JP | A-2001-345778 | 12/2001 |
| JP | A-2004-343699 | 12/2004 |
| JP | A-2007-129490 | 5/2007 |
| JP | A-2008-514135 | 5/2008 |

* cited by examiner

SYNCHRONIZATION OF FRONT-END AND BASEBAND UNITS IN WIRELESS COMMUNICATIONS DEVICE BY WIRELESSLY TRANSMITTING CLOCK SIGNAL THEREBETWEEN

This application relates to and claims the benefit of Japanese Patent Application No. 2009-072099, filed on Mar. 24, 2009, the contents of which are herein wholly incorporated by reference.

BACKGROUND OF THE INVENTION

1. Field of the Invention

The present invention relates to a wireless device in which front-ends and a baseband unit are separately provided at different positions and are connected to each other by wire.

2. Description of the Related Art

In in-vehicle wireless devices, a wireless device (receiver) and an antenna are provided so as to be separated from each other. Therefore, in order to prevent signal loss or a mixture of noise, a thick coaxial cable needs to be provided, which makes it difficult to perform wiring. In addition, since the thick cable is used, the weight of the wireless device increases, and manufacturing costs also increase.

In order to solve these problems, a front-end unit may be provided immediately below the antenna. When the front-end unit of the wireless device is provided immediately below the antenna, signals can be transmitted to a baseband unit with low signal loss or at a low frequency (an intermediate frequency or a baseband frequency) capable of reducing the influence of noise. In addition, when digital transmission is performed between the front-end unit and the baseband unit, it is possible to further reduce connection loss or the influence of noise. The transmission of signals between the front-end unit and the baseband unit is performed as follows. The front-end unit converts a received analog signal into a digital signal, further converts the digital signal into a serial signal, and transmits the serial signal to the baseband unit. The baseband unit converts the received serial digital signal into a parallel digital signal and further converts the digital signal into an analog signal. In this way, it is possible to convert an analog signal including a control signal into a digital signal.

As such, when the front-end unit and the baseband unit are provided so as to be separated from each other, a unit for achieving clock synchronization between the front-end unit and the baseband unit is needed in order to achieve clock synchronization between an AD converter of the front-end unit and a baseband process. When a wiring line for a reference clock is provided for clock synchronization, the number of wiring lines is increased.

For example, the clocks of local oscillators or AD converters between the front-ends need to be synchronized with each other in order for a plurality of front-ends to receive signals from a plurality of antennas and to perform diversity combining between a plurality of signals (Japanese Patent Application Laid-Open (JP-A) No. 2001-345778). When a plurality of front-end units receives signals of different wireless systems and one baseband unit processes the received signals at the same time, it is necessary to perform clock synchronization between the baseband unit and each front-end unit. When a wiring line is provided for each reference clock for clock synchronization between the front-end unit and the baseband unit, the number of wiring lines is increased.

When data is transmitted in serial, the clock is superimposed on data, and the data is reproduced from the clock. In this way, it is possible to avoid the addition of wiring lines. However, this structure has the following problems. First, clock synchronization is not appropriately performed due to the degree of purity of signals during clock reproduction. Second, when data transmission is simultaneously performed using a plurality of wireless systems with different symbol rates, it is necessary to use a clock frequency common to a plurality of wireless systems in order to achieve the synchronous transmission of data, and a common minimum clock frequency may be excessively high according to combinations of the symbol rates. In order to solve the second problem, a sampling frequency conversion method has been proposed which performs arbitrary frequency conversion into a predetermined common clock. However, signal distortion occurs in this conversion method.

SUMMARY OF THE INVENTION

The invention has been made in order to solve the above problems, and an object of the invention is to provide a wireless device capable of achieving clock synchronization without increasing the number of wiring lines between a front-end unit and a baseband unit.

In order to achieve the object, in the invention, synchronization is achieved by the following units and processes in a wireless device in which a front-end unit and a baseband unit are separated from each other.

According to an aspect of the invention, a wireless device includes a baseband unit and one or more front-end units. The baseband unit and the front-end units are provided in individual housings. The baseband unit and the front-end units are connected to each other by wire. A transmitter that converts a signal based on a reference clock into a radio signal and transmits the radio signal as a clock synchronization signal is provided in any one of the housings. Receivers that receive the signal for the clock synchronization and PLLs that generate a clock synchronized with a reference clock signal which is obtained from the clock synchronization signal are provided in the housings other than the housing having the transmitter provided therein.

According to the above structure, since clock synchronization is achieved by the radio signal, it is not necessary to provide wiring lines for clock synchronization and it is possible to prevent an increase in the number of wiring lines. In this way, it is possible to perform asynchronous transmission between the front-end units and the baseband unit.

The wireless device according to the above aspect may perform communication using a plurality of wireless systems having different symbol rates at the same time and use a plurality of different reference clocks. The transmitter, the receiver, and the PLL may be provided for each reference clock.

According to the above structure, when the wireless device needs to handle a plurality of different symbol rates, wireless signals are used to achieve synchronization for each reference clock. In a method in which a clock signal is superimposed on serial transmission between the front-end unit and the baseband unit to achieve synchronization, it is difficult to manage a case in which a common minimum clock frequency is high. However, according to the invention, this problem does not arise. In addition, when a wiring line for clock synchronization is provided for each reference clock, the number of wiring lines is increased. However, in the invention, since radio signals are used, it is possible to prevent an increase in the number of wiring lines.

In the wireless device according to the above aspect, the transmitter may transmit the clock synchronization signal as a burst signal. In addition, the transmitter may perform carrier sensing before burst transmission.

When signals are transmitted in the form of burst, it is possible to reduce an adverse influence on peripheral apparatuses. In addition, carrier sensing is performed, and when other wireless signals do not exist, burst transmission is performed. Therefore, it is possible to reduce an adverse influence on other apparatuses.

In the wireless device according to the above aspect, the transmitter may transmit the clock synchronization signal including identification information. The identification information corresponds to, for example, information for identifying a wireless device, information for identifying reference clocks when a plurality of reference clocks is used in one wireless device, and information for identifying both the wireless device and the reference clocks. In this case, the receiver may determine whether the clock synchronization signal is received from a corresponding transmitter based on the identification information and update the PLL when the clock synchronization signal is received from the corresponding transmitter.

When the identification information is included in the clock synchronization signal, identification information may be superimposed on a radio clock synchronization signal and then transmitted, or AM modulation may be performed on the radio clock synchronization signal such that the identification information is included in the radio signal.

As such, since the identification information is included in the clock synchronization signal, the receiver can determine the type of a clock synchronization signal. Therefore, it is possible to prevent the wireless device from being erroneously synchronized with the clock.

The wireless device according to the invention may include at least some of the above components. A clock synchronization method according to the invention may include at least some of the above processes. The above units and processes may be appropriately combined with each other to form various structures of the invention.

According to the above aspect of the invention, it is possible to achieve clock synchronization without increasing the number of wiring lines between the front-end unit and the baseband unit.

DETAILED DESCRIPTION OF THE EMBODIMENTS

Hereinafter, embodiments of the invention will be described with reference to the accompanying drawings.
<Overall Structure>

Figure 1:
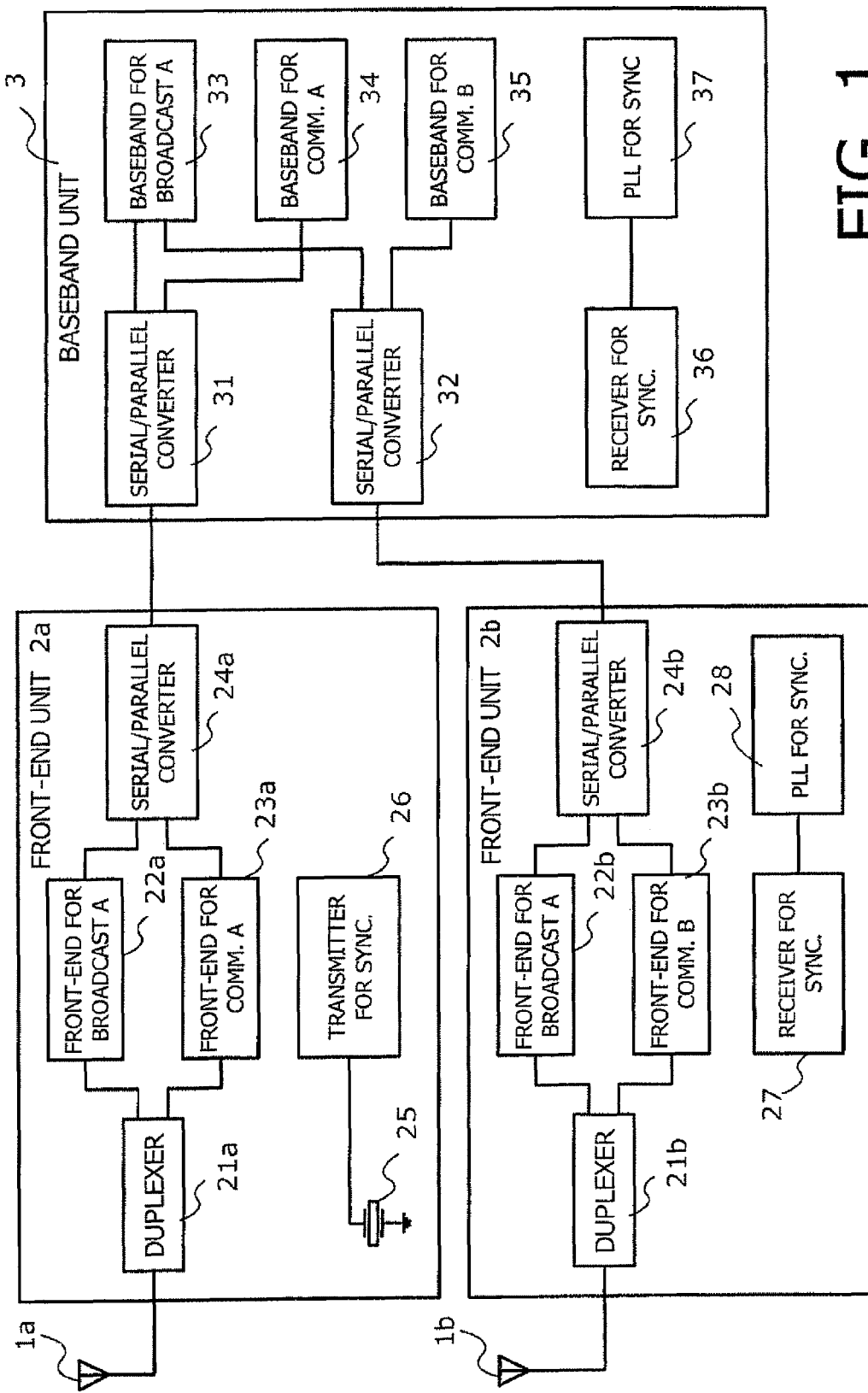
FIG. 1 is a diagram illustrating the structure of a wireless device according to an embodiment of the invention.

FIG. 1 is a diagram illustrating the overall structure of a wireless device according to an embodiment of the invention. The wireless device according to this embodiment generally includes a front-end unit 2a connected to a multi-band antenna 1a, a front-end unit 2b connected to a multi-band antenna 1b, and a baseband unit 3 that is wirelessly connected to the front-end units 2a and 2b. The front-end units 2a and 2b and the baseband unit 3 are provided in different housings.

The multi-band antenna 1a is designed for broadcasting A and communication A. The front-end unit 2a includes a duplexer 21a connected to the antenna 1a, a front-end 22a for broadcasting A, a front-end 23a for communication A, and a serial/parallel converter 24a. The front-ends 22a and 23a perform frequency conversion between a baseband frequency and a wireless frequency or analog/digital conversion. A received signal is converted into a digital signal by the front-ends 22a and 23a and is then converted into a serial signal by the serial/parallel converter 24a. Then, the serial digital signal is transmitted to the baseband unit 3. The serial digital signal transmitted from the baseband unit 3 is converted into a parallel signal by the serial/parallel converter 24a and is then converted into an analog signal by the front-end 23a. Then, the analog signal is wirelessly transmitted. The transmission rate between the front-end unit 2a and the baseband unit 3 may be set regardless of the symbol rate of wireless communication. In addition, the transmission rate may not be concerned with a clock that generates a wireless symbol timing.

The multi-band antenna 1b is designed for the broadcasting A and communication B, and the front-end unit 2b includes a front-end for the broadcasting A and the communication B. Since the basic structure of the front-end unit 2b is the same as that of the front-end unit 2a, a detailed description thereof will not be repeated.

The baseband unit 3 includes serial/parallel converters 31 and 32 that perform the serial/parallel conversion of signals transmitted to and from the front-end units 2a and 2b, a baseband processing unit 33 for broadcasting A, a baseband processing unit 34 for communication A, and a baseband processing unit 35 for communication B. The baseband processing unit 34 for communication A performs data communication with the front-end unit 2a through the serial/parallel converter 31. The baseband processing unit 35 for communication B performs data communication with the front-end unit 2b through the serial/parallel converter 32. The baseband processing unit 33 for broadcasting A receives data from the front-end units 2a and 2b through the serial/parallel converters 31 and 32 in order to perform diversity reception.

As such, in the wireless device according to this embodiment, the front-end units 2a and 2b and the baseband unit 3 are provided in different housings. Signal to be transmitted between the front end unit and the baseband unit is digitized and converted to lower frequency (to intermediate frequency or baseband frequency). Therefore, it is possible to prevent signal loss due to the connection between the front-end unit and the baseband unit or the influence of noise on communication.

<Structure for Clock Synchronization>

When the front-end unit and the baseband unit provided in different housings are wired-connected to each other, it is necessary to perform clock synchronization between an AD conversion process and a baseband process of the front-end unit. When diversity combining is performed, it is necessary to perform the clock synchronization of a local oscillator or an AD converter between the front-ends.

In the wireless device according to this embodiment, the following structure is used for clock synchronization. That is, the front-end unit 2a includes a reference clock signal generation unit 25 and a transmitter 26 for synchronization, and the front-end unit 2b and the baseband unit 3 include receivers 27 and 36 for synchronization and PLLs 28 and 37 for synchronization, respectively. A reference clock signal generated by the reference clock signal generation unit 25 of the front-end unit 2a is transmitted as a radio signal (a clock synchronization signal) to the front-end unit 2b and the baseband unit 3 by the transmitter 26. In the front-end unit 2b and the baseband unit 3, the receivers 27 and 36 receive the clock synchronization signal and synchronize the PLLs 28 and 37 with the reference clock. The front-end unit 2b and the baseband unit 3 perform processes in synchronization with the clock signals output from the PLLs 28 and 37. In this way, clock synchronization is performed in the wireless device.

In this embodiment, for example, the reference clock signal generation unit 25 and the transmitter 26 are provided in the front-end unit 2a, but the invention is not limited thereto. The reference clock signal generation unit 25 and the transmitter 26 may be provided in any housing. For example, the reference clock signal generation unit 25 and the transmitter 26 may be provided in the front-end unit 2b or the baseband unit 3.

When the broadcasting A, the communication A, and the communication B have different symbol rates, it may be difficult to generate a clock signal based on one reference clock according to combinations of the symbol rates. In this case, a plurality of reference clocks corresponding to all the symbol rates may be provided and transmitters and receivers for clock synchronization signals and PLLs may be provided for each of the plurality of reference clocks. In this case, it may be arbitrarily selected, for each reference clock, which housing the clock generation unit and the transmitter are provided.

[Transmitter for Transmitting Clock Synchronization Signal]

Figure 2:
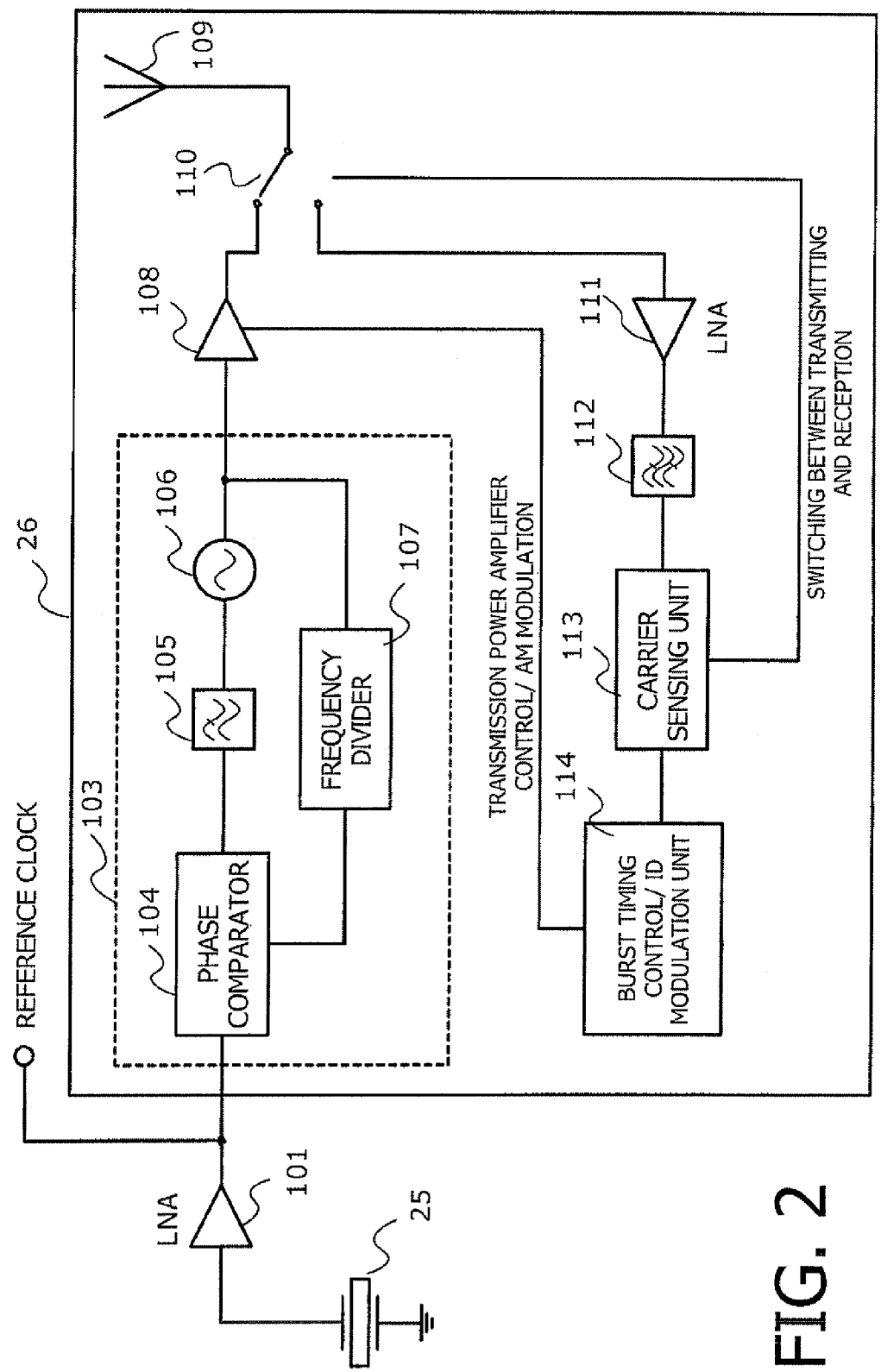
FIG. 2 is a diagram illustrating the structure of a transmitter that transmits a clock synchronization signal.

Next, a structure for clock synchronization will be described in detail. FIG. 2 is a diagram illustrating the structure of a transmitter that transmits the clock synchronization signal. The clock signal generated by the reference clock signal generation unit 25 is amplified by an amplifier 101 and the amplified signal is supplied as a reference clock signal to the front-end 1a and is also input to the transmitter 26 for synchronization. The reference signal input to the transmitter 26 is converted into a radio frequency by the frequency conversion circuit 103, and the transmission power of the radio frequency is amplified by an amplifier 108. Then, the radio frequency is transmitted from an antenna 109. In this embodiment, a PLL (phase locked loop) including a phase comparator 104, a loop filter 105, a VOC (voltage controlled oscillator) 106, and a frequency divider 107 is used as the frequency conversion circuit that converts the reference signal into the radio frequency. The frequency divider 107 divides the frequency of an input signal by N (N is an integer). Therefore, the reference signal input to the frequency conversion circuit 103 is converted into a radio signal (clock synchronization signal) with a radio frequency that is N times higher than the frequency of the input reference signal. The amplifier 108 performs AM modulation on the reference clock such that the reference clock can be identified.

A switch 110 can switch the transmission and the reception of signals by the antenna 109. The received signal is input to a carrier sensing unit 113 through an LNA 111 and a band-pass filter 112. The carrier sensing unit 113 performs carrier sensing before the clock synchronization signal is transmitted. When the carrier sensing unit 113 does not detect other signals, it performs burst transmission on the clock synchronization signal. A burst timing control/ID modulation unit 114 controls the amplifier 108 to perform burst transmission and AM modulation on the reference clock. When a plurality of reference clock signals is used in one wireless device, different AM modulation processes are performed on the reference clock signals in order to identify the reference clock signals. When there is a plurality of wireless devices of the same type, AM modulation peculiar to each wireless device is performed such that the wireless device is not erroneously synchronized with the clock synchronization signal from another wireless device. Therefore, different AM modulation processes are performed for each wireless device and each reference clock.

[Receiver for Receiving Clock Synchronization Signal]

Figure 3:
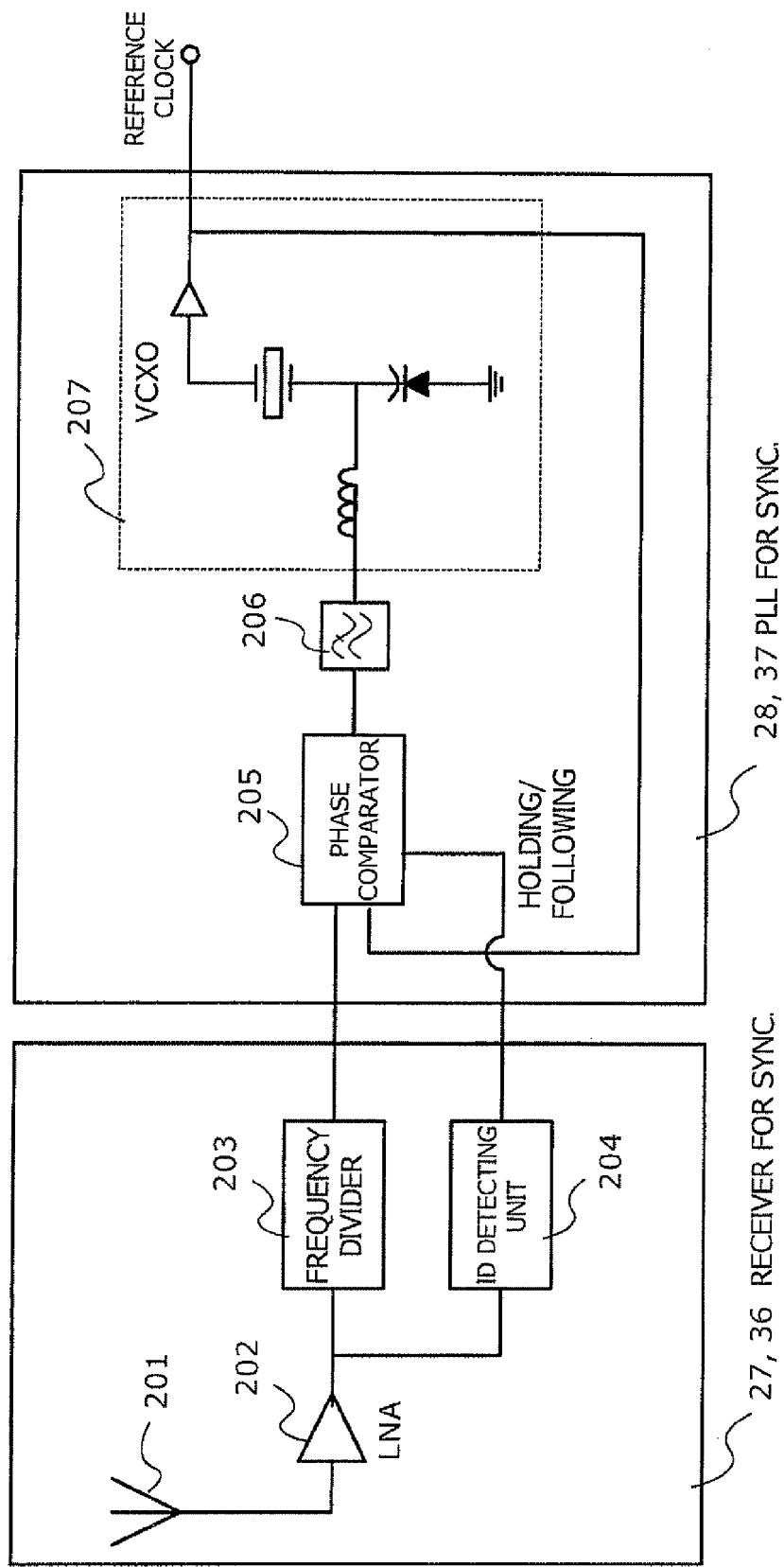
FIG. 3 is a diagram illustrating the structure of a receiver that receives the clock synchronization signal and a PLL for synchronization.

FIG. 3 is a diagram illustrating the structure of a receiver that receives the clock synchronization signal. Each of the receivers 27 and 36 for synchronization includes an antenna 201, an LNA 202, a frequency divider 203, and an ID detection unit 204. The clock synchronization signal received by the antenna 201 is amplified by the LNA 202. The frequency of the amplified signal is divided by N by the frequency divider 203 and the signal is input as a reference signal to the PLLs 28 and 37 for synchronization. The ID detection unit 204 demodulates the received signal to determine whether the received signal is transmitted to the ID detection unit 204 itself. When receiving the clock synchronization signal transmitted thereto, the ID detection unit 204 controls the PLLs 28 and 37 for synchronization to follow the received signal. When the clock synchronization signal transmitted to the ID detection unit 204 is not received, the ID detection unit 204 controls the PLLs 28 and 37 for synchronization to hold the current output. The following and holding control is performed by a holding/following control signal input from the ID detection unit 204 to the phase comparator 205.

Each of the PLLS 28 and 37 for synchronization includes a phase comparator 205, a loop filter 206, and a VCXO (voltage controlled crystal oscillator) 207, and outputs a signal that is synchronized with the reference signal input from the frequency divider 203. When each of the receivers 27 and 36 for synchronization receives the clock synchronization signal transmitted thereto and the following control signal output from the ID detecting unit 204 is input to the phase comparator 205, the phase comparator 205 outputs a signal corresponding to the phase difference between the reference signal input from the frequency divider 203 and the signals output from the PLLs 28 and 37 for synchronization. On the other hand, when each of the receivers 27 and 36 for synchronization does not receive the clock synchronization signal transmitted thereto and the holding control signal output from the ID detecting unit 204 is input to the phase comparator 205, the phase comparator 205 outputs a high-impedance signal, regardless of the phase difference between the input signals, thereby holding the current voltage of the loop filter. As such, the receiver identifies the received clock synchronization signal. When receiving the signal whose destination is the receiver, the receiver performs a synchronization process. On the other hand, when receiving the signal whose destination is another receiver, the receiver stays in a held state without performing synchronization process.

<Operation and Effects of this Embodiment>

According to the wireless device of this embodiment, when the front-end unit is separated from the baseband unit, the clock synchronization signal is wirelessly transmitted therebetween. Therefore, it is possible to achieve clock synchronization without adding wiring lines between the front-end unit and the baseband unit.

In a case in which the wireless device handles a plurality of wireless systems with different symbol rates, even when the symbol rates are combined with each other such that a common minimum clock frequency is excessively high, it is possible to synchronize the reference clocks by providing a transmitter and a receiver that transmits and receives a clock synchronization signal for each reference clock. It is possible to achieve synchronization by a clock radio signal for synchronization in any combination of symbol rates. Therefore, when a plurality of wireless systems is used at the same time, it is possible to achieve good clock synchronization without any restrictions in combinations of symbol rates.

The clock synchronization signal is not continuously transmitted, but is burst for transmission. In addition, before the signal burst is transmitted, carrier sensing is performed. Therefore, it is possible to minimize influence on other wireless devices.

Modulation corresponding to the reference clock is performed on the clock synchronization signal. Therefore, each wireless device for synchronization can determine whether the received clock synchronization signal is only for the wireless device. As a result, it is possible to prevent the wireless device from being erroneously synchronized with the clock synchronization signal.

What is claimed is:

1. A wireless device comprising:
   a baseband unit; and
   a plurality of front-end units configured to perform diversity combining between signals received at a plurality of antennas from different wireless systems;
   the baseband unit and the plurality of front-end units are each provided in individual housings,
   the baseband unit and the plurality of front-end units are connected to each other by wire to transmit a wired signal,
   a transmitter provided in any one of the housings, the transmitter being configured to convert a second signal based on a reference clock into a radio signal and wirelessly transmit the radio signal as a clock synchronization signal, and
   one or more receivers that receive the clock synchronization signal and one or more PLLs that generate a clock synchronized with a reference clock signal which is obtained from the clock synchronization signal provided in one or more individual housings other than the housing having the transmitter provided therein, wherein
   the one or more individual housings other than the housing having the transmitter are synchronized to the radio signal.

2. A wireless device according to claim 1,
   wherein the wireless device performs communication using a plurality of wireless systems having different symbol rates at the same time and uses a plurality of different reference clocks, and
   the transmitter, the receiver of the one or more receivers, and a PLL of the one or more PLLs are provided for each reference clock.

3. A wireless device according to claim 1,
   wherein the transmitter transmits the clock synchronization signal as a burst signal.

4. A wireless device according to claim 3,
   wherein the transmitter performs carrier sensing before burst transmission.

5. A wireless device according to claim 1,
   wherein the transmitter transmits the clock synchronization signal including identification information, and
   the one or more receiver determines whether the clock synchronization signal is received from a corresponding transmitter based on the identification information and updates the one or more PLLs when the clock synchronization signal is received from the corresponding transmitter.

6. A wireless device according to claim 1,
   wherein the reference clock is set based on a symbol rate of a wired data communication between the baseband unit and the one or more front-end units.

7. A wireless device according to claim 1,
   wherein the wireless device performs communication using a plurality of wireless systems having different symbol rates at the same time and uses a plurality of different reference clocks,
   the transmitter, a receiver of the one or more receivers, and a PLL of the one or more PLLs are provided for each reference clock,
   the transmitter transmits the clock synchronization signal including identification information, and
   the one or more receivers determine whether the clock synchronization signal is received from a corresponding transmitter based on the identification information and updates the one or more PLLs when the clock synchronization signal is received from the corresponding transmitter.

8. A wireless device according to claim 7,
   wherein the transmitter performs AM modulation on the clock synchronization signal based on the identification information.

* * * * *